United States Patent [19]

Clancy et al.

[11] Patent Number: 4,545,012
[45] Date of Patent: Oct. 1, 1985

[54] ACCESS CONTROL SYSTEM FOR USE IN A DIGITAL COMPUTER SYSTEM WITH OBJECT-BASED ADDRESSING AND CALL AND RETURN OPERATIONS

[75] Inventors: Gerald F. Clancy, Saratoga, Calif.; Stephen I. Schleimer, Chapel Hill; Craig J. Mundie, Cary, both of N.C.; Steven J. Wallach, Saratoga, Calif.; Richard G. Bratt, Wayland; Edward S. Gavrin, Lincoln, both of Mass.

[73] Assignee: Data General Corporation, Westboro, Mass.

[21] Appl. No.: 266,522

[22] Filed: May 22, 1981

[51] Int. Cl.[4] ............................................. G06F 7/06
[52] U.S. Cl. .................................................. 364/200
[58] Field of Search ... 364/200 MS File, 900 MS File, 364/300

[56] References Cited

U.S. PATENT DOCUMENTS

| | | | |
|---|---|---|---|
| 3,891,974 | 6/1975 | Coulter et al. | 364/200 |
| 4,025,901 | 5/1977 | Bachman et al. | 364/200 |
| 4,084,228 | 4/1978 | Dufond et al. | 364/200 |
| 4,325,120 | 4/1982 | Colley et al. | 364/200 |
| 4,374,409 | 2/1983 | Bienuenu et al. | 364/200 |

Primary Examiner—Thomas M. Heckler
Assistant Examiner—Tim A. Wipns
Attorney, Agent, or Firm—Robert F. O'Connell

[57] ABSTRACT

An access control system for use in a digital computer system wherein the memory system is organized into objects, a data item is locatable by specifying an object, instructions are contained in procedures, and the operations performed by the system include a call operation for suspending an execution of a procedure and commencing another execution and a return operation for terminating an execution and resuming a suspended execution. The access control system associates each procedure with a domain, i.e., a set of objects accessible to the procedure. The access control system further includes a secure stack object which is accessible only to the access control system. When a call operation commences execution of a procedure which has a different domain, the access control system responds to the call operation by storing information required to return to the current domain in the secure stack. When a return operation resumes execution of a procedure which has a different domain, the access control system responds to the call operation by using the information in the secure stack to return to the previous domain.

26 Claims, 1 Drawing Figure

ACCESS CONTROL SYSTEM FOR USE IN A DIGITAL COMPUTER SYSTEM WITH OBJECT-BASED ADDRESSING AND CALL AND RETURN OPERATIONS

CROSS REFERENCE TO RELATED APPLICATIONS

The present patent application is related to U.S. patent application Ser. No. 266,407, *System for Controlling Access to Data in a Digital Processing System* (as amended), Ser. No. 266,409, *Digital Data Processing System*, and Ser. No. 266,530, *Universal Addressing System for a Digital Data Processing System* (as amended), all filed on even date with the present application and assigned to the assignee of the present application.

BACKGROUND OF THE INVENTION

1. Field of the Invention

The present invention relates to digital data processing systems and more particularly to systems for controlling access to data in digital data processing systems.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to access control systems employed in digital computer systems which commence executions of procedures by means of call operations and terminate executions by means of return operations. In the access control system of the present invention, the digital computer system's memory is organized into objects. Data items stored in the memory are locatable by means of the objects. Each procedure executed in the digital computer system may access only a limited set of objects. Those objects accessible to a given procedure are termed a domain.

The access control system responds to each memory operation specifier by performing the specified memory operation on the specified data item only if the object by which the data item is locatable is in the domain accessible to the procedure currently being executed. The access control system includes a secure stack object upon which only the access control system performs memory operations. When a call operation commences execution of a procedure which has a different domain from that of the procedure currently being executed, a component of the access control system saves information required to return to the domain of the procedure currently being executed on the secure stack object. When a return operation terminates execution of a procedure which has a domain different from that of the procedure whose execution is resumed by the return statement, another component of the access control system obtains the information required to return to the domain of the procedure whose execution is being resumed from the secure stack object.

Other aspects of the invention include the use of access control list entries including subject templates to limit access to objects to certain subjects representing entities for which the digital computer system executes instructions and the formation of subjects out of a plurality of object identifiers specifying objects containing information about the subject.

It is thus an object of the invention to provide an improved digital computer system.

It is an additional object of the invention to provide an improved access control system for a digital computer system.

It is a further object of the invention to provide an access control system including domains of objects accessible only to certain procedures and secure stack objects for saving information used to return to a domain.

It is another object of the invention to provide an access control system utilizing access control list entries containing subject templates to control access to objects; and It is a still further object of the invention to provide an access control system utilizing a subject consisting of a plurality of object identifiers specifying objects containing information about the subject.

Other objects, advantages and features of the present invention will be understood by those of ordinary skill in the art, after referring to the following detailed description of the preferred embodiments and drawings wherein:

Figure 1:
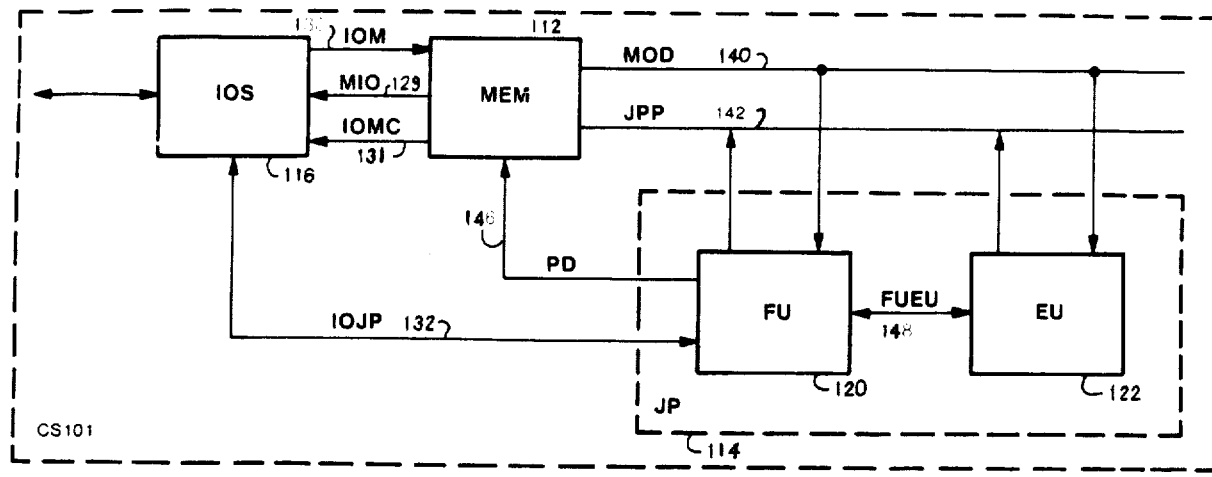
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,455,602, on June 19, 1984.

More particularly, attention is directed to FIGS. 103, 270, 271, 301, 408–440, 447, 463, 467, 469, 470 and 471 of the drawings in application Ser. No. 266,402, and to that part of the descriptive portion of the specification, particularly at pages 777–780, 813–841 and 1016–1057 thereof, which relate to the subject matter of the claims herein.

What is claimed is:

1. In a digital computer system including
   (A) memory means for performing memory operations including storing and providing items of data, said items of data including instructions, and
   (B) processor means connected to said memory means for performing operations in response to instructions including processing items of data and further wherein
   said instructions are contained in procedures of said data items and said processor means responds to an instruction while executing the procedure containing said instruction, and the operations performed by said processor means include
      (a) a call operation suspending the execution of a current procedure and commencing the execution of another procedure and
      (b) a return operation for terminating the execution of said another procedure and resuming the execution of the procedure which was suspended, an access control system comprising:
   (1) memory organization means operative on said memory means for organizing said memory means into objects allowing the location of said data items therein and limiting access to an object to selected procedures and thereby defining domains, each procedure having access only to objects belonging to a single domain;
   (2) memory operation specifier generation means in said processor means responsive to instructions for providing a memory operation specifier for each data item processed by processor, the memory operation specifier for a given data item specifying the object in which said data item is to be located;
   (3) memory operation means operative on said memory means and responsive to a memory operation specifier for performing the memory operation specified thereby only when the object specified in said memory operation specifier belongs to the domain to which the procedure containing the instruction to which said processor means is currently responding has access;
   (4) a secure stack object of said objects upon which only said access control system performs said memory operations;
   (5) means responsive to a call operation when said call operation commences execution of another procedure having a different domain for saving in said secure stack object information required to return to the domain of the procedure whose execution is being suspended; and
   (6) means responsive to a return operation when said return operation terminates the execution of a procedure having a different domain from that of the procedure whose execution is being resumed for obtaining said saved information from said secure stack object for the procedure whose execution is being resumed.

2. In the access control system of claim 1, and further wherein:

each unterminated execution is associated with a frame of said data items; the frame for a given execution being contained in a stack object of the objects belonging to the domain to which the procedure being executed has access; and the saved information specifies the object containing the frame associated with the procedure whose execution is being resumed.

3. In the access control system of claim 2, and further wherein:

said processor means executes each of said procedures for one of a plurality of processes; and each said process has associated with it a secure stack object and a stack object belonging to each domain accessible by the procedures whose executions by said process have not yet terminated.

4. In the access control system of claim 1, and further wherein;

each said domain is represented by means of a domain identifier; and said saved information specifies the domain identifier for the domain for the procedure whose execution is being resumed.

5. In the access control system of claim 1, and further wherein:

said memory organization means identifies for each object a selected set of subjects representing entities for which said processor means can respond to instructions;

said processor means responds to instructions for a current subject;

said memory operation means performs the memory operation specified in said memory operation specifier only when a current subject is one of said selected set of subjects; and said current subject represents at least the domain defined for the procedure containing the instruction to which said processor means is currently responding.

6. In a digital computer system including (A) memory means for performing memory operations including storing and providing items of data, said items of data including instructions, and (B) processor means connected to said memory means for performing operations in response to instructions including processing items of data, an access control system comprising:

(1) memory organization means operative on said memory means for organizing said memory means into objects allowing the location of said data items therein and associating with each object at least one access control list entry data item containing a subject template specifying a selected set of subjects representing entities for which said processor means responds to said instructions;

(2) memory operation specifier generation means in said processor means responsive to instructions for providing a memory operation specifier for each data item processed by said processor, the memory operation specifier for a given data item specifying the object in which said data item is to be located and one of said memory operations; and (3) memory operation means operative on said memory means and responsive to a memory operation specifier for performing the memory operation specified thereby on the data item specified thereby for a current subject for which said processor means is currently responding to said instructions only when said current subject is one of said subjects in said selected set of subjects specified by the subject template in the acess control list entry for the object specified in said memory operation specifier.

7. In the access control system of claim 6, and further wherein:

said subject includes a plurality of subject components; and said subject template contains a plurality of component templates, each of said component templates corresponding to one of said components, and each of said component templates alternatively matches only one of said corresponding subject components, a group of said corresponding subject components, or any said corresponding subject component, as specified by said component template.

8. In the access control system of claim 7, and further wherein:

entities in said digital computer system including objects are identified by means of unique identifiers;

each said subject component is one of said unique identifiers;

each said component template includes (a) a flavor specifier specifying whether said corresponding subject component which matches said component template must be a single corresponding subject component, must belong to a group of said corresponding subject components, or may be any said corresponding subject component; and (b) a universal identifier which, when said flavor specifier specifies a single said corresponding subject component, must be identical to said corresponding subject component for said corresponding subject component to match, and when said flavor specifier specifies a group of said corresponding subject components, identifies an object by which the data items representing a group of universal identifiers are locatable, which group of universal identifiers must include one universal identifier which is identical to the corresponding subject component for said corresponding subject component to match.

9. In a digital computer system including (A) memory means for performing memory operations including storing and providing items of data, said items of data including instructions, and (B) processor means connected to said memory means for performing operations in response to said instructions including processing said items of data an access control system comprising:

(1) memory organizations means operative on said memory means for organizing said memory means into objects allowing the location of data items therein and identifying for each object a universal identifier uniquely and permanently identifying said object and a selected set of subjects representing entities for which said processor means responds to said instructions, each subject being represented by a plurality of said universal identifiers;

(2) memory operation specifier generation means in said processor means responsive to instructions for providing a memory operation specifier for each data item processed by said processor, a memory operation specifier for a given data item specifying the object whereby said given data item is to be located and one of said memory operations; and (3) memory operation means operative on said memory means and responsive to said memory operation specifier for performing the memory operation specified thereby on the data item specified thereby for a current subject for which said processor means is currently executing said instructions only when said current subject is one of the subjects in the selected set of subjects identified for the object specified in said memory operation specifier.

10. In the digital computer system of claim 9, and further wherein:

each universal identifier in said plurality of universal identifiers in said current subject identifies one said object by which information concerning said current subject is locatable.

11. In a digital data processing system including at least one local digital data processing system, each of said local systems including at least processor means for processing items of data in response to instructions of said items, a universal addressing system for addressing said items comprising:

(1) universal memory means accessible to each of said local systems for storing and providing data items, said universal memory means including (a) memory organization means for organizing said universal memory means into objects identified by unique identifiers, each data item being permanently associated with an object and being locatable by specifying the unique identifier identifying said associated object and an offset specifying the location of said data item in said associated object, (b) unique identifier pointers of data items specifying locations in said objects, each unique identifier pointer containing a unique identifier and an offset, and (c) memory operation means responsive to a memory operation specifier including a logical address representing a unique identifier and an said offset and a memory command specifying a memory operation for performing the memory operation specified by said memory commond on the data item specified by said logical address;

(2) pointer conversion means in said processor means operating in response to said instructions and to any one of said unique identifier pointers for generating a logical address representing the same unique identifier and the same offset as is contained in said unique identifier pointer; and (3) means responsive to said instructions and said generated logical address for generating a memory operation specifier containing said generated logical address and providing said generated memory operation specifier to said memory operation means.

12. In a digital computer system including (A) memory means for performing memory operations including storing and providing items of data, said items of data including operations, and (B) processor means for performing operations in response to said instructions, a unique identifier addressing system for addressing said items of data in said memory means comprising:

(1) memory organization means for organizing said memory means into objects permanently identified by unique identifiers, each data item being associated with an object and being locatable by specifying a unique identifier identifying said associated object and an offset specifying the location of said data item in said associated object;

(2) unique identifier pointers of data items specifying locations in said objects, each unique identifier pointer containing a unique identifier and an offset;

(3) memory operation means responsive to a memory operation specifier including a logical address representing a unique identifier and an offset and a memory command specifying a memory operation for performing a memory operation specified by said memory command on the data item specified by said logical address;

(4) pointer conversion means in said processor means operating in response to said instructions and to any one of said unique identifier pointers for generating a logical address representing the same unique identifier and the same offset as is contained in said unique identifier pointer; and (5) means responsive to said instructions and said generated logical address for generating a memory operation specifier containing said generated logical address and providing said generated memory operation specifier to said memory operations means.

13. In the unique identifier addressing system of claim 12, and further wherein:

said offset in said unique identifier pointer is settable to identify any bit locatable by the object specified by the unique identifier in said unique identifier pointer.

14. In the unique identifier addressing system of claim 12, and further wherein:

said data items further include object-relative pointers, each object-relative pointer containing an offset specifying a location in an object by which said object-relative pointer is locatable; and said pointer conversion means is further responsive to any one of said object-relative pointers and to the logical address specifying said object-relative pointer for generating a logical address by combining the logical address specifying said object-relative pointer and the offset contained in said object relative pointer so that said generated logical address specifies the object containing said object-relative pointer and said offset contained in said object-relative pointer.

15. In the unique identifier addressing system of claim 12, and further wherein:

said processor means further includes logical address conversion means operating in response to said instructions and to a first logical address for generating a unique identifier pointer containing a unique identifer and an offset represented by said first logical address.

16. In the unique identifier addressing system of claim 15 and further wherein:

said data items further include object-relative pointers, each object-relative pointer containing an offset specifying a location in an object by which said object-relative pointer is locatable;

said pointer conversion means is further responsive to any one of said object-relative pointers and to the logical address specifying said object-relative pointer for generating a logical address by combining the logical address specifying the object-relative pointer and the offset contained in said object relative pointer so that said generated logical address specifies the object containing said object-relative pointer and said offset contained in said object-relative pointer; and said descriptor conversion means further receives a second logical address specifying where the data item produced by said descriptor conversion means is to be stored in said memory means and generates an object-relative pointer when said second logical address and said first logical address represent the same universal identifier.

17. In a digital computer system including memory means for storing items of data including instructions and processor means connected to said memory means for performing operations in response to said instructions, means for identifying entities in said digital computer system comprising:
  (1) unique identifier generation means response to the operation of said digital computer system for generating unique identifiers;
  (2) memory organization means for receiving first certain unique identifiers and organizing said memory means into objects of said entities uniquely and permanently identified by said unique identifiers, each said data item being locatable by an object; and
  (3) operating system means for receiving second certain unique identifiers and associating said second certain unique identifiers with other entities.

18. In the entity identifying means of claim 17, and wherein: said unique identifier generation means includes
  (a) first unique identifier generation means for generating object universal identifiers of said universal identifiers for identifying said objects and
  (b) second unique identifier generation means for generating non-object universal identifiers of said universal identifiers which do not identify said objects.

19. In the entity identification means of claim 17, and wherein:
said operating system means further includes means for temporarily associating certain said unique identifiers representing entities currently required in operations of said processor means with values which represent said unique identifiers internally to said processor means.

20. In the entity identification means of claim 17, and further wherein:
said memory organization means further identifies for each object a set of subjects representing entities for which said processor means responds to instructions and limits access to each object to the subjects belonging to said set of subjects;
each subject is represented by a plurality of universal identifiers; and
said operating system means associates a current subject with the instructions to which said processor means is currently responding.

21. In the entity identification means of claim 17, and wherein:
said digital computer system performs operations for a plurality of users of said digital computer system; and
said operating system means associates each said user with one of said universal identifiers.

22. In the entity identification means of claim 17, and further wherein:
said digital computer system executes instructions of data items for a plurality of processes; and
said operating system means associates each process with one of said universal identifiers.

23. In the entity identification means of claims 17, and further wherein;
said digital computer system executes instructions of data items for a plurality of said processes;
said instructions for certain of said processors are executed concurrently by said digital computer system;
each of said certain processes is associated with one of a plurality of virtual processors; and
said operating system means associates each of said virtual processors with one of said universal identifiers.

24. In the entity identification means of claim 17, and further wherein:
said digital computer system executes instructions of data items contained in sequences of said instructions;
each of said instruction sequences is associated with a domain defining a set of the objects containing the data items accessible to an instruction sequence; and
said operating system means associates each of said domains with one said universal identifier.

25. In a digital data processing system including
  (A) at least one local digital data processing system, each said local system including at least processor means for processing items of data in response to instructions of said items, and
  (B) universal memory means accessible to each said local system for storing and providing data items, means for identifying entities in said digital computer system comprising:
  (1) at least one unique identifier generation means responsive to the operation of said digital computer system for generating unique identifiers, each of said unique identifiers being unique throughout said digital data processing system;
  (2) at least one memory organization means for receiving first certain unique identifiers and organizing said universal memory means into objects of entities identified by unique identifiers, each data item being locatable by means of an object; and
  (3) at least one operating system means for receiving second certain unique identifiers and associating said second certain unique identifiers with other said entities.

26. In the entity identifying means of claim 25, and further wherein:
each said processor means is associated with one of said operating system means; and
an operating system means associated with a given said processor means further includes means for temporarily associating certain unique identifiers representing entities currently required in operations of said given processor means with values which represent said unique identifiers internally to said given processor means.

* * * * *